April 15, 1941.　　　　G. S. ALLIN　　　　2,238,094
STUMP SPLITTER
Filed Jan. 27, 1939
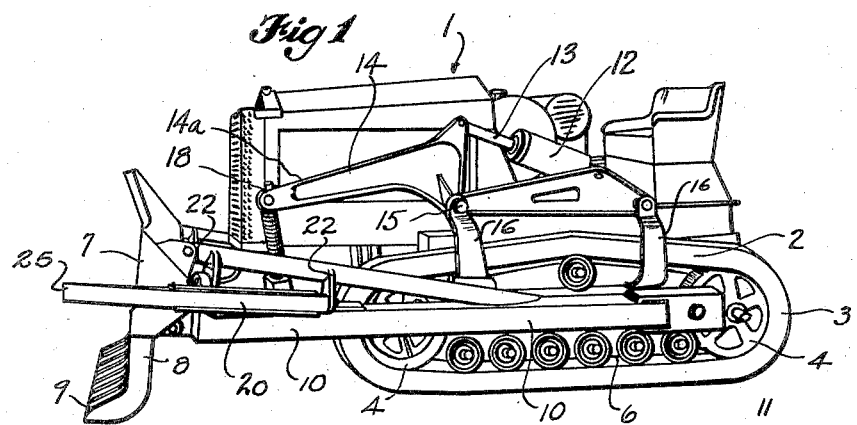
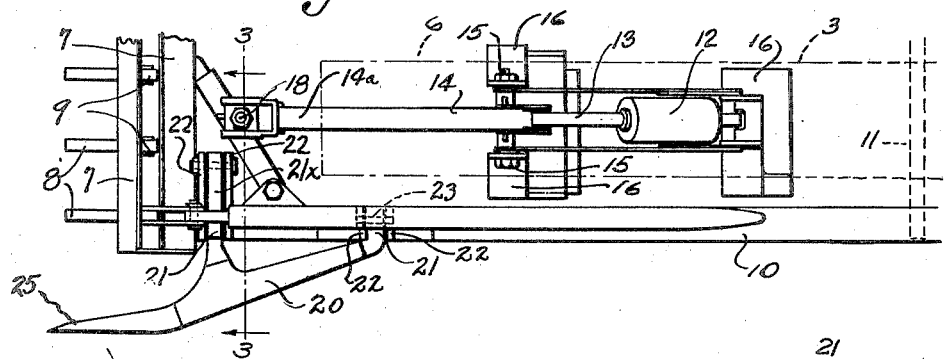
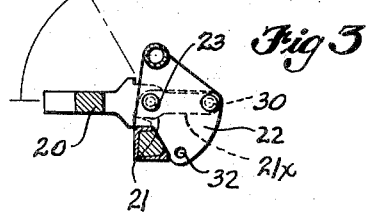
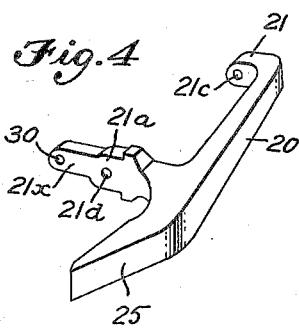
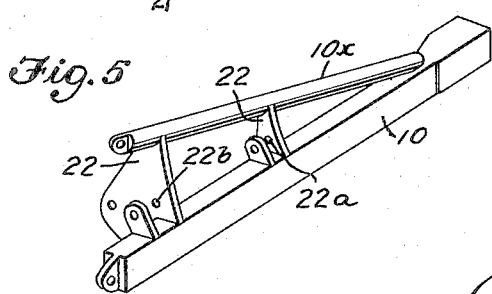
INVENTOR
GEORGE S. ALLIN
BY
Cook & Robinson
ATTORNEY Patented Apr. 15, 1941

2,238,094

UNITED STATES PATENT OFFICE 2,238,094

STUMP SPLITTER

George S. Allin, Seattle, Wash.

Application January 27, 1939, Serial No. 253,098

9 Claims. (Cl. 37—2)

This invention relates to stump splitting and removing machines, and has reference more particularly to improvements in machines which are known in trade as "bulldozers' or "road builders" to adapt them to the splitting and removal of tree stumps from land being cleared; it being contemplated that the present invention might be embodied in a machine solely for the purpose of stump removal or that it might be in the nature of an attachment device for machines of the kind embodying a tractor wherein a ground or dirt moving, or land clearing blade is supported across the forward end thereof by means of a frame or by thrust beams that extend along opposite sides of the tractor and are pivotally fixed at their rearward ends to the tractor frame in such manner as to permit the blade to be raised and lowered in order that it may be lifted clear of the ground or lowered therein to various working depths.

It is the principal object of this invention to provide a machine such as a tractor of the crawler type, with a thrust beam which mounts a stump splitting wedge thereon, extending in the direction of thrust, so that it may be used for the splitting and removal of tree stumps.

More specifically stated, the object of the invention resides in the provision of a stump splitting device which is in the form of an elongated wedge attached to a bracket that is hingedly fixed to the forward end portion of one of the thrust beams as used on a bulldozer or the like, and which wedge has a sharpened, splitting end extended forwardly of the tractor and which may be driven into a stump by the forward travel of the tractor and thus utilized to split off slabs from the stump or to uproot the stump by a proper maneuvering of the tractor after the wedge has been driven into the stump.

It is also an object of this invention to support the splitting wedge of the attachment device by means of a hingedly fixed bracket in order to provide that the wedge may be moved from its functional position disposed somewhat laterally of the end of the bulldozer blade, to a position above or within the limits of the blade where it will not be an obstruction in the normal use of the bulldozer for ground clearing purposes.

Other objects of the invention reside in the details of construction of the supporting bracket and wedge, and in the provision of means for retaining these parts either in functional or non-functional positions.

Still further objects reside in the details of construction and in the combination of parts and in their mode of operation and use as will hereinafter be fully described.

In accomplishing the above objects, I have provided the improved details of construction, the preferred forms of which are illustrated in the accompanying drawing, wherein—

Fig. 1 is a side elevation of a bulldozer that is equipped with a stump splitting device embodied by the present invention.

Fig. 2 is a plan view of a part of the bulldozer showing the disposition of the stump splitting device on a thrust beam.

Fig. 3 is a cross-sectional detail illustrating the different positions of adjustment of the wedge and the details providing for locking the bracket in functional and non-functional positions.

Fig. 4 is a perspective view of the stump splitting wedge.

Fig. 5 is a perspective view of the thrust beam on which the stump splitting wedge is mounted.

Referring more in detail to the drawing—

1 designates, in its entirety, a bulldozer, or similar type of machine with which the present stump splitting attachment is associated. The bulldozer comprises as a part thereof, a tractor 2 equipped at opposite sides with endless belt treads 3 extending about supporting and driving wheels 4 mounted in track frames not herein illustrated in detail but indicated in general by that part identified by reference character 6; it being understood that these track frames are operatively attached to the main frame of the tractor by conventional or suitable means.

Disposed across the tractor somewhat beyond its forward end, is a frame structure 7 which mounts a plurality of downwardly extending teeth, 8, which may be of the same length, preferably equally spaced apart and provided at their lower ends with forwardly directed plow portions 9; this particular device being adapted for the combing of the surface of brush, rocks and the like, and is known in trade as a "rock clearing blade." This frame structure 7 is supported functionally in position by means of thrust beams 10 which are disposed along the opposite sides of the tractor, outside of the track frames 6 and parallel therewith. The rearward ends of the thrust beams are pivotally fixed to a dead axle mounted on the main frame of the tractor. This axle is here designated by numeral 11, and the beams pivot thereon in a manner which permits the blade to be raised and lowered.

The adjustment of the blade is accomplished by means of an adjusting mechanism supported on the track frames and which comprises at each side of the machine, a hydraulic cylinder 12 with its piston rod 13 operatively connected with one arm of a bell crank lever 14; the bell crank lever being pivotally fixed by a bolt 15 on a support 16 attached to the track frame. The bell crank has an arm 14a extended forwardly of the point of support and attached at its end, through the mediacy of a bolt 18, with the forward end portion of the thrust beam 10 at that side of the vehicle. Without going into a detailed explanation of the mode of operation, it is believed sufficient to say that the hydraulic cylinders 12 at opposite sides of the vehicle are connected with a source of supply of pressure medium that may be applied as desired through the manipulation of suitable control valves, not here shown, to cause the actuation of the piston rods to raise or lower the blade frame and to retain it at any set position of adjustment. It is to be understood, that the details of construction of the means for raising and lowering the blade mounting frame are not of importance in the present instance so long as a suitable means is provided whereby the thrust beams may be adjusted to a desired position and retained at that set position.

Stump splitting wedges are applicable to cable lift bulldozers for the same purpose and in substantially the same manner as herein illustrated.

The stump splitting member, as noted best in Fig. 4, is formed as an integral forging comprising a straight body portion 20 which terminates, at what is designated as the rear end, in a laterally turned mounting bar 21, and toward its forward end has a laterally extending mounting arm 21a and at its forward end the body is formed into an elongated, tapered wedge 25, extending at a slight angle to the direction of the body bar 20. The bar 20, ear 21, arm 21a and wedge 25 all lie in the same plane, and the ear and arm are formed respectively with holes 21c and 21d for reception of mounting pivot pins, and these holes are axially aligned substantially parallel with the direction of the wedge portion 25.

To better sustain the ground working frame structure 7, which is mounted by the thrust beams 10, there is provided, at each side of the machine, a secondary thrust member 10x. These members 10x are disposed above and lengthwise of the beams 10 and are fixed at their rear ends to the beams substantially close to the pivotal mountings of the latter, and extend forwardly and upwardly at a slight angle relative to the beams 10. Connecting webs or flanges 22 rigidly join the forward end portions of the beams 10 and the corresponding thrust members 10x, and the spacing of these webs corresponds to the spacing of the ear 21 and arm 21a longitudinally of the wedge member 20.

When the wedge member is functionally mounted, the ear 21 and arm 21a horizontally overlie the beam 10 at one side of the machine and are pivotally mounted by pivot pins 23 which extend through the holes 21c and 21d of the parts 21 and 21a and through registering holes 22a and 22b in the flanges 22 to hingedly mount the wedge member on the beam 10. The bar 20 is thus so mounted that the wedge 25 will extend in a line parallel to the direction of the thrust beam 10. By reference to Fig. 2, of the drawing, it will be understood also that when the stump splitting wedge bar is disposed in functional position, it is disposed, to some extent, laterally of the end of the blade and thus can be used without interference by the blade.

In using the device, the bar 20 first is swung to the horizontal position as shown in Fig. 3, and in that position rests on beam 10. Then the tractor is moved forwardly so that the splitting end of the wedge will enter the tree stump which has been designated at T in Fig. 2. To facilitate the entering action, the end of the wedge is tapered to a vertical edge so as to be parallel with the grain of the wood of the stump. After the wedge has been driven into a stump to a certain extent, if a slab is not thus split from the stump, the tractor may then be maneuvered so as to utilize the prong as a pry for forcibly splitting the slab loose. This operation of splitting slabs may be repeated until the stump has been reduced to such extent that it may be lifted out or pulled out by use of the prong, or, if desired, by use of teeth of the rock blade. It is a usual procedure to advance the tractor to cause the wedge 25 to enter the stump and to split off a slab; then, without withdrawing the wedge, driving the tractor forwardly to cause the teeth of the blade to engage with the root structure of the split off piece to lift it from the ground.

In order that the hinged bracket may be held in a non-functional position when not in use, the forward hinge arm 21a is provided with an extension 21x beyond the hinge point, and this is provided with a hole 30 located eccentric of the hinge axis, and this is adapted to be registered with a hole 32 in one of the supporting flanges as noted in Fig. 3 to receive a bolt to hold the bracket against downward movement.

While I have here shown the device as an attachment for bulldozers, it is to be understood that any tractor or powered vehicle might be equipped with a thrust beam and wedge in a manner to function as the device above described, without requiring that the vehicle be equipped with devices for other uses.

Stump splitting attachments of the character illustrated and described may be made in various sizes and with details differing somewhat from those herein illustrated; therefore, it is not intended that the claims to follow shall restrict the device to the details of construction herein illustrated, but that they shall be given an interpretation that is commensurate with the scope of the invention herein disclosed.

Having thus described my invention, what I claim as new therein and desire to secure by Letters Patent is:

1. A machine of the character described comprising a tractor, a thrust beam fixed thereto and extending in the direction of travel, and a wedge bar fixed to the thrust beam and extending therefrom in the direction of travel; said bar having a vertical splitting edge for engaging and entering a stump by forward travel of the tractor.

2. A machine of the character described comprising a tractor, a thrust beam fixed at one end to the tractor, and having vertical adjustment at its other end, means for holding the beam at different positions of adjustment and a stump splitting wedge bar fixed to the thrust beam at its adjustable end and extending therefrom in the direction of thrust.

3. A machine of the character described comprising a tractor, a thrust beam disposed along one side thereof, and operatively fixed at one end to the tractor for vertical adjustment at its other end, and a stump splitting wedge bar fixed to and extending in the direction of the beam and forwardly thereof.

4. A device as in claim 3 wherein the wedge bar is mounted by a bracket having hinged connections on the thrust beam whereby the wedge may be moved from a position inside the beam to a position laterally thereof.

5. In a machine of the character described, comprising a tractor, a ground working means supported at one end thereof, a thrust beam supporting said means, and a stump splitting wedge mounted on said thrust beam and extending in the direction of thrust.

6. In a machine of the character described, having a frame structure and ground working means disposed transversely of the machine beyond one end thereof, and means supporting said blade including a thrust beam attached to said frame structure; a stump splitting wedge bar adjustably fixed in said thrust beam and extending therefrom in the direction of thrust, and adjustable from a position within to a position outside the lateral limits of the ground working means.

7. In a machine of the character described having ground working means disposed across one end thereof supported from the machine for vertical adjustment relative thereto by means including a thrust beam; a stump splitting wedge extending in the direction of thrust and hingedly attached to the said beam for adjustment about a hinge axis that extends in the direction of thrust.

8. A device as in claim 7 wherein the wedge, by reason of the hinge mounting, is movable from a position within the limits of the ground working means to a position laterally thereof and means is provided for locking it in its different positions of adjustment.

9. A machine of the character described comprising a tractor, a frame mounted by the tractor and extending forwardly thereof, ground raking teeth mounted by the frame at its forward end, and a forwardly extending stump splitting wedge mounted by the frame at its forward end at one side of the tractor.

GEORGE S. ALLIN.